(12) United States Patent
Desmond et al.

(10) Patent No.: US 11,941,493 B2
(45) Date of Patent: Mar. 26, 2024

(54) DISCOVERING AND RESOLVING TRAINING CONFLICTS IN MACHINE LEARNING SYSTEMS

(71) Applicant: International Business Machines Corporation, Armonk, NY (US)

(72) Inventors: Michael Desmond, White Plains, NY (US); Matthew R. Arnold, Ridgefield Park, NJ (US); Jeffrey S. Boston, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 16/287,224

(22) Filed: Feb. 27, 2019

(65) Prior Publication Data

US 2020/0272938 A1 Aug. 27, 2020

(51) Int. Cl.
*G06N 20/00* (2019.01)
*G06N 3/08* (2023.01)
*G06N 7/01* (2023.01)

(52) U.S. Cl.
CPC ............. *G06N 20/00* (2019.01); *G06N 3/08* (2013.01); *G06N 7/01* (2023.01)

(58) Field of Classification Search
CPC ................................. G06N 20/00; G06N 3/08
See application file for complete search history.

(56) References Cited

U.S. PATENT DOCUMENTS

| | | |
|---|---|---|
| 11,379,718 B2 | 7/2022 | Desmond |
| 2015/0254555 A1 | 9/2015 | Williams, Jr. et al. |
| 2016/0155069 A1 | 6/2016 | Hoover et al. |
| 2017/0082555 A1 | 3/2017 | He |
| 2017/0154280 A1 | 6/2017 | Adir |
| 2017/0169354 A1 | 6/2017 | Diamanti |
| 2018/0082211 A1 | 3/2018 | Allen |
| 2018/0314971 A1 | 11/2018 | Chen |
| 2018/0358001 A1 | 12/2018 | Amid |
| 2019/0102683 A1 | 4/2019 | Jayaraman |

(Continued)

OTHER PUBLICATIONS

Guan, D et al., Identifying mislabeled training data with the aid of unlabeled data, 2010 [retrieved Jun. 3, 2021]. Retrieved from Internet:<https://link.springer.com/content/pdf/10.1007/s10489-010-0225-4.pdf>, 14 pages (2010) (Year: 2010).*

(Continued)

*Primary Examiner* — Vincent Gonzales
*Assistant Examiner* — Bart I Rylander
(74) *Attorney, Agent, or Firm* — Daniel J Blabolil

(57) ABSTRACT

A method optimizes a training of a machine learning system. A conflict detection system discovers a conflict between a first training data and a second training data for a machine learning system, where the first training data and the second training data are ground truths that describe a same type of entity, and where the first training data and the second training data have different labels. In response to discovering the conflict between the first training data and the second training data for the machine learning system, an oracle adjusts the different labels of the first training data and the second training data. The machine learning system is then trained using the first training data and the second training data with the adjusted labels.

20 Claims, 11 Drawing Sheets

(56) References Cited

U.S. PATENT DOCUMENTS

| | | |
|---|---|---|
| 2019/0188212 A1 | 6/2019 | Miller |
| 2019/0188574 A1 | 6/2019 | Menon |
| 2021/0017419 A1 | 6/2021 | Michael |

OTHER PUBLICATIONS

Sun, J., et al., Identifying and Correcting Mislabeled Training Instances, 2007 [retrieved Jun. 3, 2021]. Retrieved from Internet:<https://ieeexplore.ieee.org/stamp/stamp.jsp?tp=&arnumber=4426127>, 7 pages (2007) (Year: 2007).*

Schikuta, E., et al., A Cloud-Based Neural Network Simulation Environment, 2013 [retrieved Jun. 4, 2021]. Retrieved from Internet:<https://link.springer.com/content/pdf/10.1007%2F978-3-642-38679-4_12.pdf>, 11 pages (2013) (Year: 2013).*

Bruzzone, L., et al., A Novel Context-Sensitive Semisupervised SVM Classifier Robust to Mislabeled Training Samples, [retrieved Nov. 30, 2021]. Retrieved from Internet:<https://ieeexplore.ieee.org/abstract/document/4914804/> 13 pages. (Year: 2009).*

Hernandez, D., et al., A Simple Model for Classifying Web Queries by User Intent, [retrieved Mar. 17, 2022]. Retrieved from Internet:<http://personales.upv.es/prosso/resources/HernandezEtAl_CERI12.pdf> (Year: 2012).*

Patil, P., et al., Analysis of Banking Data Using Machine Learning, [retrieved Mar. 17, 2022]. Retrieved from Internet:<https://ieeexplore.IEEE.org/abstract/document/8058305> (Year: 2017).*

UCI KDD Archive—Summary of Data Sets. [retrieved Mar. 18, 2022]. Retrieved from Internet:<http://kdd.ics.uci.edu> (Year: 2009).*

UCC KDD Archive—Data test set. [retrieved Mar. 18, 2022]. Retrieved from Internet:<http://kdd.ics.uci.edu> (Year: 2009).*

Bovolo, F., et al., A Context-Sensitive Technique Based on Support Vector Machines for Image Classification, [retrieved Mar. 31, 20922] . Retrieved from internet:<https://link.springer.com/chapter/10.1007/11590316_36> (Year: 2005).*

Brodley, C., et al., Identifying Mislabeled Training Data, [retrieved Mar. 21, 2022]. Retrieved from Internet:<https://www.jair.org/index.php/jair/article/view/10238> (Year: 1999).*

Grotton, T., et al., A Comparison of Language Identification Approaches on Short, Query-Style Texts, [retrieved Mar. 21, 2022]. Retrieved from Internet:<https://link.springer.com/chapter/10.1007/978-3-642-12275-0_59> (Year: 2010).*

Hagen, M., et al., What was the Query? Generating Queries for Document Sets with Applications in Cluster Labeling, [retrieved Mar. 21, 2022]. Retrieved from Internet:<https://link.springer.com/chapter/10.1007/978-3-319-19581-0_10> (Year: 2015).*

Kotsiantis, E., et al., Forecasting Fraudulent Financial Statements using Data Mining, [retrieved Mar. 21, 2022]. Retrieved from Internet:<http://140.116.51.3/chinese/faculty/shulc/courses/cas/articles/Forecasting%20fraudulent%20financial%20statements%20using%20data%20mining.pdf> (Year: 2006).*

Vajda, S., et al., Semi-automatic ground truth generation using unsupervised clustering and limited manual labeling: Application to handwritten character recognition. [retrieved Mar. 21, 2022]. Retrieved from Internet:<https://www.sciencedirect.com/science/article/pii/S0167865515000380> (Year: 2015).*

Tang, L., et al., Large Scale Multi-Label Classification via MetaLabeler, [retrieved Aug. 16, 2022]. Retrieved from Internet:<https://dl.acm.org/doi/abs/10.1145/1526709.1526738> (Year: 2009).*

Bair, E., Semi-supervised clustering methods, [received Aug. 31, 2023]. Retrieved from Internet:<https://wires.onlinelibrary.wiley.com/doi/abs/10.1002/wics. 1270> (Year: 2013).*

P. Mell et al., "The NIST Definition of Cloud Computing", National Institute of Standards and Technology, Information Technology Laboratory, Sep. 2011, pp. 1-7.

Y. Sun et al., "Label-and-Learn: Visualizing the Likelihood of Machine Learning Classifier's Success During Data Labeling", IUI'17 Proceedings of the 22nd International Conference on Intelligent User Interfaces, ACM, New York, NY, 2017, pp. 523-534.

S. Liu et al., "Towards Better Analysis of Machine Learning Models: a Visual Analytics Perspective", Elsevier, Visual Informatics 1, 2017, pp. 48-56.

Anonymously, "Ranking and automatic selection of machine learning models," IP.com Prior Art Database Technical Disclosure, IP.com No. IPCOM000252275D, Jan. 3, 2018, 34 pages.

IBM: List of IBM Patents or Patent Applications Treated as Related. Filed Herewith. 2 Pages.

Li et al., "Resolving conflicts in heterogeneous data by truth discovery and source reliability estimation," Proceedings of the ACM SIGMOD International Conference on Management of Data, Jun. 2014, 12 pages.

List of IBM Patents or Patent Applications Treated as Related; Date Filed: Dec. 10, 2019, 2 pages.

Wikipedia, "Cross-validation (statistics)," Wikipedia—The Free Encyclopedia, Accessed: Aug. 26, 2022, https://en.wikipedia.org/wiki/Cross-validation_(statistics)#Leave-one-out_cross-validation, 13 pages.

Wikipedia, "DBSCAN," Wikipedia—The Free Encyclopedia, Accessed Aug. 26, 2022, https://en.wikipedia.org/wiki/DBSCAN, 8 pages.

* cited by examiner

DISCOVERING AND RESOLVING TRAINING CONFLICTS IN MACHINE LEARNING SYSTEMS

BACKGROUND

The present invention relates to the field of artificial intelligence, and specifically to machine learning systems used in artificial intelligence. Still more particularly, the present invention relates to optimizing the performance of a machine learning system by discovering and resolving training conflicts in training data that is used to train the machine learning system.

SUMMARY

In an embodiment of the present invention, a method optimizes the training of a machine learning system. A conflict detection system discovers a conflict between a first training data and a second training data for a machine learning system, where the first training data and the second training data are ground truths that describe a same type of entity or concept, and where the first training data and the second training data have different labels. In response to discovering the conflict between the first training data and the second training data for the machine learning system, an oracle adjusts the different labels of the first training data and the second training data. The machine learning system is then trained using the first training data and the second training data with the adjusted labels.

In one or more embodiments, the method(s) described herein are performed by an execution of a computer program product and/or a computer system.

DETAILED DESCRIPTION

Figure 1:
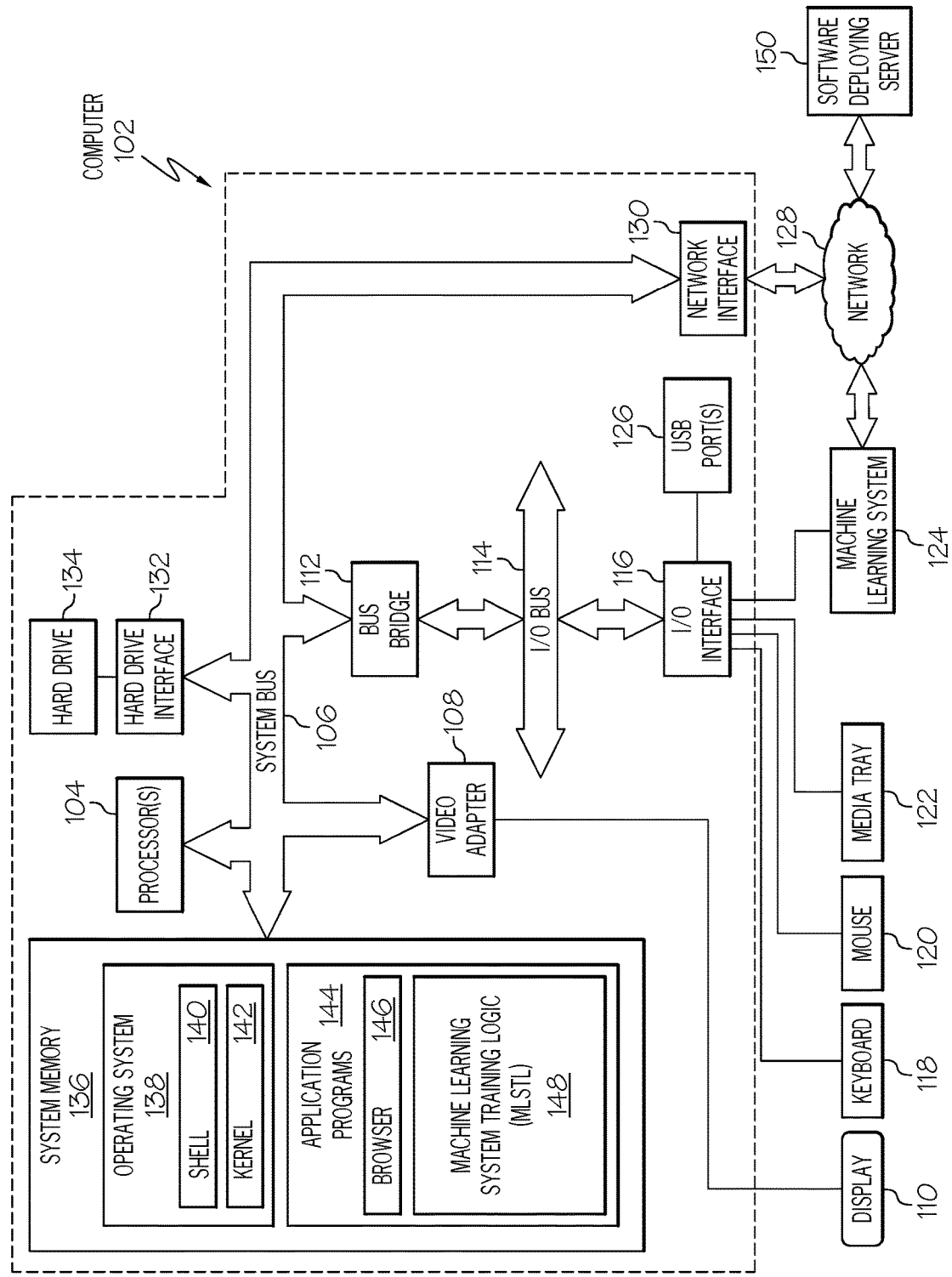
FIG. 1 depicts an exemplary system and network in which the present invention can be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for and within computer 102 can be utilized by software deploying server 150 and/or machine learning system 124.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), a machine learning system 124, and external USB port(s) 126. While the format of the ports connected to I/O interface 116 can be any known to those skilled in the art of computer architecture, in one embodiment some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 can be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Machine Learning System Training Logic (MLSTL) 148. MLSTL 148 includes code for implementing the processes described below, including those described in FIGS. 2-11. In one embodiment, computer 102 is able to download MLSTL 148 from software deploying server 150, including in an on-demand basis, wherein the code in MLSTL 148 is not downloaded until needed for execution. Note further that, in one embodiment of the present invention, software deploying server 150 performs all of the functions associated with the present invention (including execution of MLSTL 148), thus freeing computer 102 from having to use its own internal computing resources to execute MLSTL 148.

Also connected to (or alternatively, as part of) computer 102 is a machine learning system 124. In exemplary embodiments of the present invention, machine learning system 124 is a deep neural network (see FIG. 7), a convolutional neural network (see FIGS. 8-10), or another type of heuristic artificial intelligence.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

Supervised machine learning (ML) algorithms use methods that require as input labeled data from which they learn relevant features that can then be applied on new unseen data.

Unsupervised ML algorithms use methods that do not require any labeled data and can instead detect patterns in the data.

Most existing ML solutions fall into the category of supervised ML algorithms and thus, they require as input labeled data. This is true for text classification problems such as intent and sentiment labeling as well as image classification problems such as facial detection, pattern recognition, and object detection.

The quality of machine learning solutions is strongly dependent on the quality of the input data used for training the ML solution (i.e., GIGO: Garbage In Garbage Out). As such, the input data must be properly labeled, in order to properly train the learning machine.

In the machine learning context, ground truth conflicts occur when ground truth instances are mislabeled, thereby causing confusion between classes in the trained model. That is, a ground truth is data that is known to be accurate, since it is based on an observation made "on the ground" where the event/object is based. One type of ground truth conflict involves two or more identical ground truth examples, each with a different class/label.

Ground truth conflicts generalize to groups of similar (sometimes identical) ground truth examples which are inconsistently labeled, resulting in diminished model performance.

Ground truth conflicts tend to occur when multiple practitioners work on labeling ground truth data in parallel, especially when label descriptions are vague.

As such inconsistencies in labeling are introduced, model quality for a machine learning system degrades.

Figure 2:
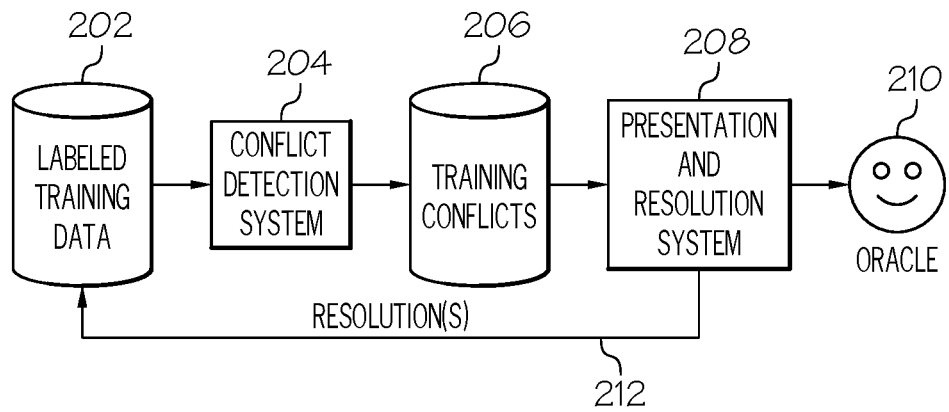
FIG. 2 illustrates a high level overview of one or more embodiments of the present invention.

With reference now to FIG. 2, a high-level overview of one or more embodiments of the present invention is presented.

One or more embodiments of the present invention provide the discovery of ground truth conflicts, and a system for presenting the conflicts to an oracle (i.e., a human and/or artificial intelligence subject matter expert in the area of labeling training data) for resolution. That is, labeled training data 202 shown in FIG. 2 is to be used to train a machine learning system. However, oftentimes the labeled training data 202 is mislabeled. That is, labeled training data 202 includes ground data (e.g., a photograph, a text passage, etc.) along with a label for that ground data, but the label could be wrong or vague.

Figure 3:
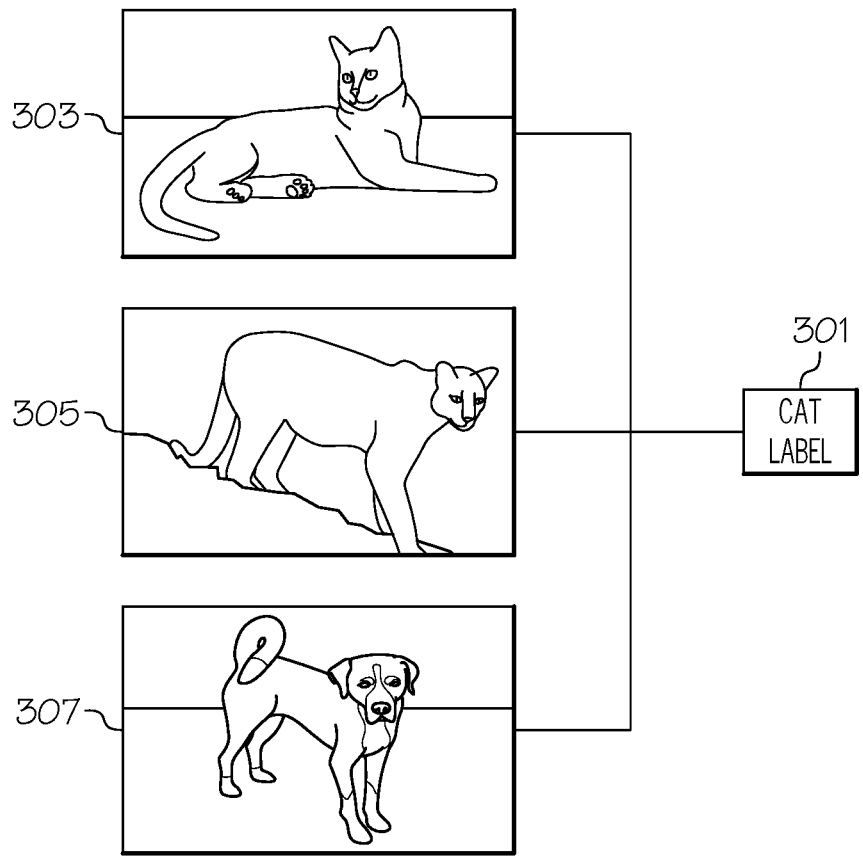
FIG. 3 depicts exemplary training data/pictures, which is used to train a machine learning system, but which are labeled by either an incorrect label and/or a vague label.

For example, consider the cat label 301 shown in FIG. 3. As shown in FIG. 3, there are three different photographic images of animals: housecat image 303; wildcat image 305; and dog image 307. However, all three images (i.e., "ground data") have the same label: cat label 301.

There are two problems with cat label 301.

The first problem is the cat label 301 clearly does not apply to dog image 307, and thus there is a first labeling conflict.

The second problem is that cat label 301 is vague and/or ambiguous. That is, "cat" generically refers to domesticated housecats and undomesticated wildcats, each of which need to have unique labels in order to train the machine learning system properly. Thus, there is a second labeling conflict.

Returning to FIG. 2, labeling conflicts are discovered by a conflict detection system 204 via an analysis of the existing ground data found in the labeled training data 202. In various embodiments of the present invention, the conflict detection system uses ground truth clustering with cross validation, decision space clustering, as described herein, and/or other systems to detect mislabeled training data, which causes the training conflicts 206.

The detected training conflicts 206 are presented via a presentation and resolution system 208 (e.g., computer 102 shown in FIG. 1) to an oracle 210, which in an embodiment is a subject matter expert (human) who determines what the proper label(s) should be. In an embodiment, the oracle 210 is an artificial intelligence system, that determines what the proper label(s) should be. In an embodiment of the present invention, the oracle 210 determines what the proper label should be according to a context of the labeled training data 202. For example, in FIG. 3 oracle 210 determines that the housecat image 303 is of a housecat, based on the fact that the photograph shows the housecat lying inside of a house. Similarly, if the training data is text from a certain context (e.g., a banking record), then the label of the training data would be contextually proper (e.g., "account balance") rather that contextually improper (e.g., "weight of a dog").

Thus, as described in FIG. 2, conflicts are presented to the oracle 210 in the context of related ground truth. As such, in the cat scenario shown in FIG. 3, the three conflicting images (housecat image 303, wildcat image 305, and dog image 307) would be shown to the oracle, along with some similar examples from the "housecat", "wildcat" and "dog" classes. The oracle 210 is then able to identify the conflict in the context of the broader ground truth.

As described above, the "housecat" represented in housecat image 303 in FIG. 3 is recognized by the cat being inside a house. However, in a preferred embodiment of the present invention, context is not based on what is shown in the content (e.g., the house interior shown in the housecat image 303), but rather is derived by comparing the conflict to other similar ground truth examples, specifically selected by the conflict algorithm. That is, the context is based on information found in the present content (e.g., housecat image 303) as well as information found in similar ground truth examples. As such, the ground truth examples contain information (e.g., image of the cat, environment of the cat, other metadata about the cat, etc.) that are used to determine that housecat image 303 is in fact that of a housecat.

As shown in line 212, conflict resolutions (e.g., reassigning the training data to another label, altering the training data and/or labels, etc.) are applied to the ground truth data and the detection and resolution process is repeated until all conflicts have been resolved by the oracle.

Figure 4:
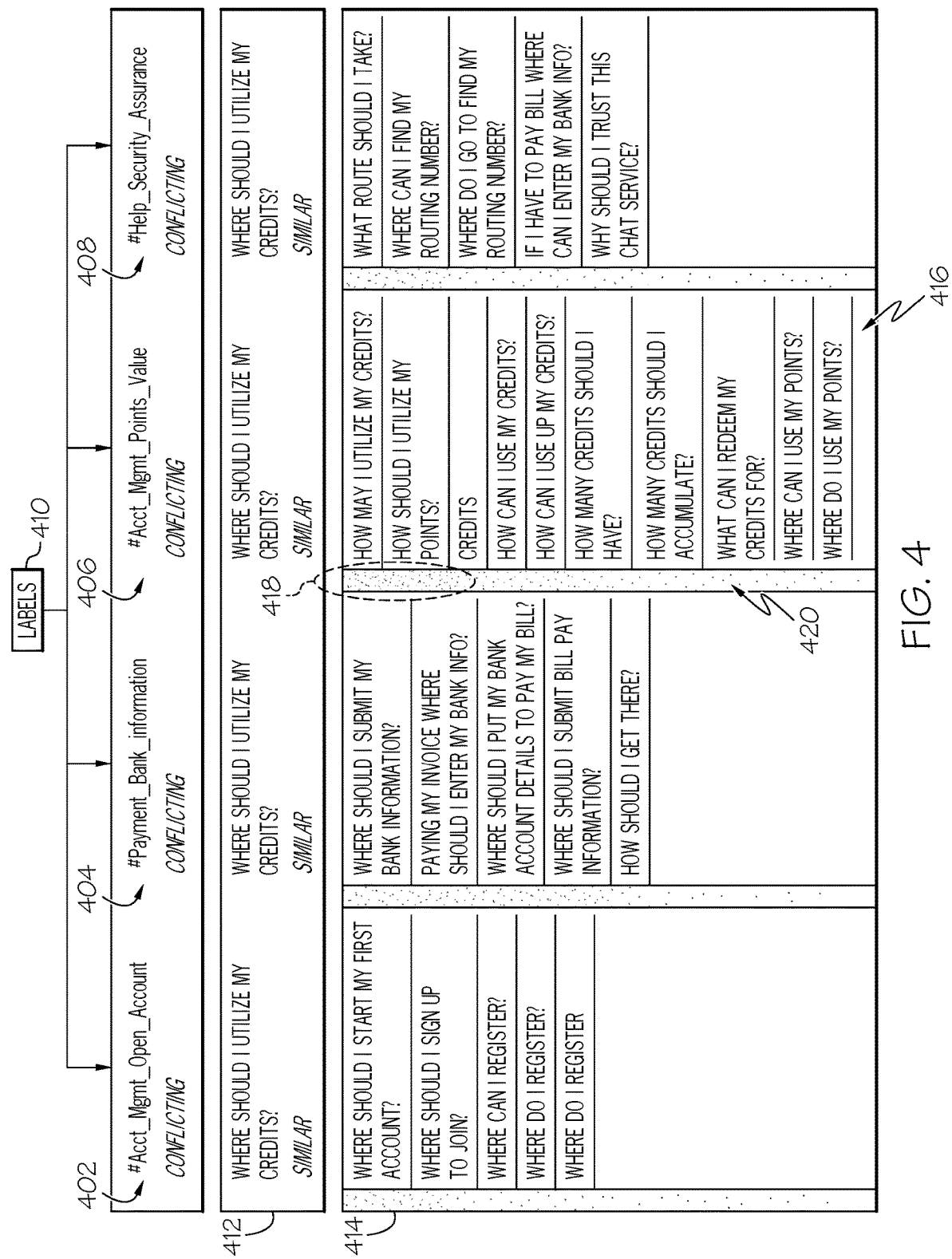
FIG. 4 illustrates an exemplary graphical user interface (GUI) that depicts a conflict in training data used in disparate types of classes/labels in accordance with one or more embodiments of the present invention.

With reference now to FIG. 4, once conflicting text data with different labels is identified, in an embodiment of the present invention other text examples associated with that label are compared to the conflicting text data in order to determine which other text examples are similar or dissimilar to the conflicting text data. Similar ground truth data is presented to the oracle in the resolution interface to guide the resolution process by indicating the most similar labeled data to the conflicting examples.

Thus, when the oracle 210 depicted in FIG. 2 looks at a conflict, and similar examples from the conflicting classes, then the oracle 210 gets a hint as to what is the correct resolution. For instance, in the dog/cat example shown in FIG. 3, if the oracle 210 saw the dog image 307 that was mislabeled as a cat by cat label 301, then the dog image 307 would be presented alongside other cat pictures as well as other dog pictures. This context helps the oracle 210 understand that the image (cat label 301) labeled as cat is actually an instance of a dog.

Thus, if a conflict spans multiple classes, but related (similar) examples from one of the classes more closely match the example in conflict, then it is likely that this class is correctly labeled using the label(s) of the one or more classes that closely match the example in conflict.

For example, in FIG. 4, assume that four classes 402, 404, 406, and 408 have labels 410. That is, class 402 is labeled as a class for opening a bank account (#Acct_Mgmt_Open_Account); class 404 is labeled as a class for information about paying on a bank load (#Payment_Bank_Information); class 406 is labeled as a class for a process related to managing loyalty points that are awarded by the bank (#Acct_Mgmt_Points_Value); and class 408 is labeled as a class for a process about ensuring that access to a bank account is secure (#Help_Security_Assurance).

However, each of these disparate classes (classes 402, 404, 406, and 408) have an identical copy of the text example 412 ("Where should I utilize my credits?"). This indicates that there is a conflict, which is defined as a subset of ground truth data (e.g., text example 412), spanning two or more classes (e.g., classes 402, 404, 406, and 408), that demonstrates a potential problem in the training data (text example 412 and/or other text examples 414) and provides enough context to help a reviewer to understand and resolve it.

Thus, the oracle 210 shown in FIG. 2 will recognize the conflict accordingly.

The oracle 210 will also recognize, based on the context of the identical copies of the text example 412, which class should actually be associated with the text example 412. That is, the context of the text example 412 ("Where should I utilize my credits?") with class 402 (#Acct_Mgmt_Open_Account) makes no sense, since opening a new bank account would have nothing to do with earned credits. However, the context of the text example 412 ("Where should I utilize my credits?") with class 406 (#Acct_Mgmt_Points_Value) contextually makes sense, since class 406 is about managing point credits.

As shown in FIG. 4, other text examples 414 within a particular class/label are also rated by the oracle 210 according to how closely related they are to the text example 412. For example, consider other text examples 416 under the class 406 (#Acct_Mgmt_Points_Value). As shown by highlight 418 of a similarity gradient 420, the text "How may I utilize my credits" is very similar to "Where should I utilize my credits?". However, "Where do I use my points" is not very similar to "Where should I utilize my credits?", and thus is farther down on the listing of other text examples 416, and is next to a lighter shading of the similarity gradient 420.

As such, "How may I utilize my credits" is deemed to be very similar to "Where should I utilize my credits?", while "Where do I use my points" is not very similar to "Where should I utilize my credits?".

Thus, and in one or more embodiments of the present invention, discovered conflicts are presented to an oracle/human for resolution. The discovered conflicts are then resolved by 1) moving conflicting examples between classes (re-labeling); 2) deleting examples (in the case of a duplicate example with an incorrect label); and/or 3) editing examples.

For example, in the example shown in FIG. 4, 1) moving conflicting examples between classes (re-labeling) would occur by moving the example "Where should I utilize my credits?" away from classes 402, 404, and 408 to class 406; 2) deleting examples would simply delete any instance of "Where should I utilize my credits?" where it is mislabeled (i.e., assigned to an incorrect class); and 3) editing examples would cause "Where should I utilize my credits?" to be rewritten as something else (e.g., "Where are my credits?").

As such, conflicts are presented in the context of existing ground truth to help the oracle/human to make the correct decisions during the resolution process.

In an embodiment of the present invention, conflicting training data is detected using 1) ground truth clustering with cross validation; and/or 2) decision space clustering.

Ground Truth Clustering with Cross Validation

Figure 5:
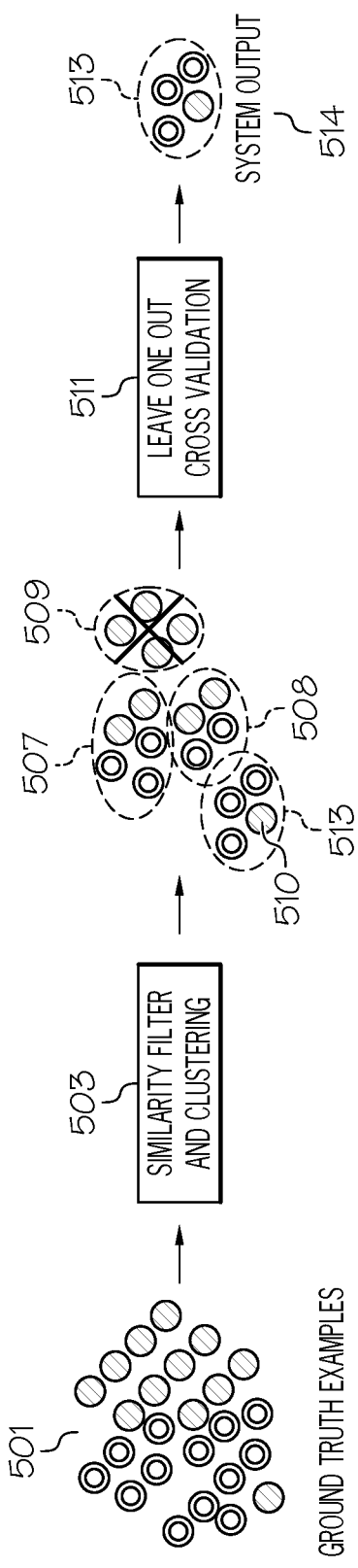
FIG. 5 depicts an exemplary ground truth clustering using cross-validation in accordance with one or more embodiments of the present invention.
Figure 6:
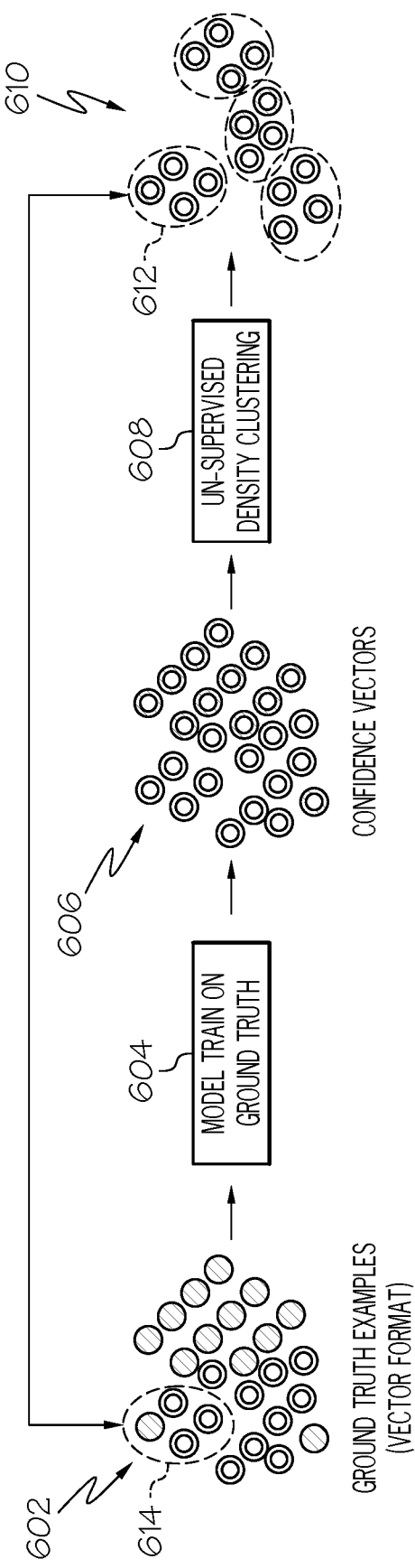
FIG. 6 illustrates an exemplary decision space clustering used in one or more embodiments of the present invention.

With reference now to FIG. 5, an exemplary use of ground truth clustering with cross validation is presented.

Ground truth examples 501 are sets of training data (text, aural, photographic, etc.) being contemplated for use in training a machine learning system. As shown in block 503, these ground truth examples 501 (which in one or more embodiments are vectors of text and/or pixel data) are filtered and clustered (e.g., by computer 102 shown in FIG. 1) to identify clusters of ground truth examples, as identified by a cluster circle. For example, the different shaded circles within cluster 507 indicate that ground truth examples are clustered across different classes. That is, just as different classes/labels 402, 404, 406, and 408 shown in FIG. 4 share a same ground truth example (text example 412), so too do the cluster circles 507, 508, 509, and 513 share one or more ground truth examples as illustrated by the darkly and lightly shaded circles within the cluster circles 507, 508, 509, and 513. Thus, as shown in FIG. 5, clusters 507, 508, and 513 contain different classes/labels.

For example, assume that cluster 507 is supposed to be for the class that is labeled "cats" and that cluster 508 is supposed to be for the class that is labeled "dogs". Assume further that the light colored circles represent pictures of cats, while the dark colored circles represent pictures of dogs. However, a picture of a dog, shown as ground truth example 510, is found in cluster 513 which also contains pictures labeled as cats. This points to a potential conflict, as it would be expected that cat and dog pictures generally appear in homogenous clusters. As such cluster 513 has a potential conflict, along with clusters 508 and 507.

However, assume further that cluster 509 is supposed to be for ground truth examples (e.g., photographs) of dogs. As shown in cluster 509, the dark colored circles again represent pictures of dogs. Since only dark colored circles (representing pictures of dogs) are within cluster 509, then there is no conflict represented by cluster 509, it is not considered as a candidate, and is not sent for validation.

In an embodiment of the present invention, each ground truth clustering that indicates a potential conflict (i.e., having examples in a cluster spanning multiple classes) is then confirmed to have a conflict by the use of cross validation, as indicated by block 511.

For example, assume that cluster 513 is being cross-validated for having a conflict, since given its composition it is expected to contain only pictures of cats, but it contains both pictures of cats as well as a picture of a dog, as indicated by the differently shaded circle within cluster 513. The leave one out cross validation step 511 is thus designed to filter out candidate conflicts, without modifying the conflicts in any way. As such, cluster 507 and cluster 508 are filtered out because they were determined not to be true conflicts as per the leave one out cross validation step 511. The leave one out cross validation step 511 takes one example at a time from each conflict cluster, and then trains a model with the remainder of the data (all of the data excluding each single example). The model is used to predict the class of the example that was singled out and checks if the prediction matches the known ground truth label for that example. If the prediction is correct (it matches the ground truth label) for each example in a candidate cluster then that candidate conflict cluster is filtered out from the algorithm results. Alternatively, if a single example in a candidate cluster is mis-predicted by the trained model, and the mis-predicted label is contained in the candidate cluster (another example in the cluster has that ground truth label), then the conflict is considered valid. In FIG. 5 candidate cluster 513 has passed the leave one out cross validation step 511 and is produced as output 514 by the conflict detection system.

Thus, in a ground truth clustering with cross-validation there is an initial intuition that clustered ground truth examples are similar, but labeled differently, thus indicating a conflict.

The set of all similar examples in the ground truth are computed based on a similarity threshold. That is, the examples are compared (e.g., similarity in visual appearance, similarity in text content, etc.) to see "how similar" they are. Ground truth instances that meet this similarity threshold are deemed to be worth considering for conflict detection.

All similar examples (above a predefined threshold) are clustered in an unsupervised manner based on density (examples with many nearby neighbors), such as a density-based spatial clustering of applications with noise (DB-SCAN), in which outlier examples are essentially ignored.

Clusters which contain examples spanning multiple classes are selected as conflict candidates.

Each candidate cluster is "leave one out" cross-validated against a model trained on the remainder of the training examples. That is, leave one out cross validation step 511 shown in FIG. 5 takes one example at a time from each conflict cluster, and trains a model with the remainder of the data (all of the data excluding each single example). The model is used to predict the class of the example that was singled out and checks if the prediction matches the known ground truth label for that example. If the prediction is correct for each example in a candidate cluster, then that candidate conflict cluster is filtered out from the algorithm results.

Alternatively, if a single example in a candidate cluster is mis-predicted, and the mis-predicted label is contained in the candidate cluster (another example in the cluster has that ground truth label), then the conflict is considered valid.

Candidate clusters that contain misclassifications (as confirmed by cross validation), in which the misclassification predicts (e.g., at a different level of confidence than that achieved before the "leave one out" process occurred) a class within the same cluster, are confirmed to be a conflict.

Decision Space Clustering

As with ground truth clustering with cross validation, in decision space clustering there is an intuition that examples in the trained model's decision space that are similar, but labeled differently, indicate a conflict in the ground truth.

Decision space clustering trains a model from all of the ground truth data.

A probability vector is then generated for each example via the trained model. The probability vector (also known as a confidence vector) represents a probability value for each label for each example in the ground truth.

Probability vectors are clustered based on density. This represents clustering within the learning model's decision space.

Clusters which contain examples spanning multiple ground truth labels are considered as candidate conflicts. Intuitively decision space clusters should be class/label homogenous. If the examples in a decision space cluster spans multiple ground truth labels, then a conflict may be present.

Thus, with reference now to FIG. 6, assume again that ground truth examples 602 are in a vector format. Assume further that, as indicated by box 604, a model (i.e., an artificial intelligence machine learning model) has been trained to output confidence vectors 606, which represent the likelihood of a particular test data representing a particular object/concept/etc. This likelihood is represented as a confidence vector.

As indicated in block 608, the confidence vectors 606 are then density clustered in an unsupervised manner, in order to create confidence vector clusters 610 and 612. Discovered clusters are compared with original labeling, such that clusters that span multiple ground truth labels are determined to be conflicts. For example, cluster 612, which corresponds to ground truth examples as highlighted in grouping 614, is deemed to be a conflict due to its corresponding ground truth examples spanning multiple classes/labels. Stated another way, cluster 612 includes ground truth examples that have different labels, as indicated by the different appearances of the circles (representing differently labeled ground truth examples) within a cluster that should have uniformly labeled ground truth examples, since confidence vector 612 is supposed to contain only ground truth examples that are for the single class/label indicated by confidence vector 612 and/or ground truth example 614.

With reference again to FIG. 1, the machine learning system 124 learns how to evaluate data. In various embodiments of the present invention, machine learning system 124 can be a neural network such as a Deep Neural Network (DNN or a Convolutional Neural Network (CNN), and/or any other machine learning system. In an embodiment of the present invention, a DNN is used to evaluate text/numeric data using corrected training text ground truth data, while a CNN is used to evaluate an image using corrected training image ground truth data. In other embodiments of the present invention, any artificial intelligence model (i.e., any type of machine learning system) uses the corrected training ground truth data.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a DNN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 7:
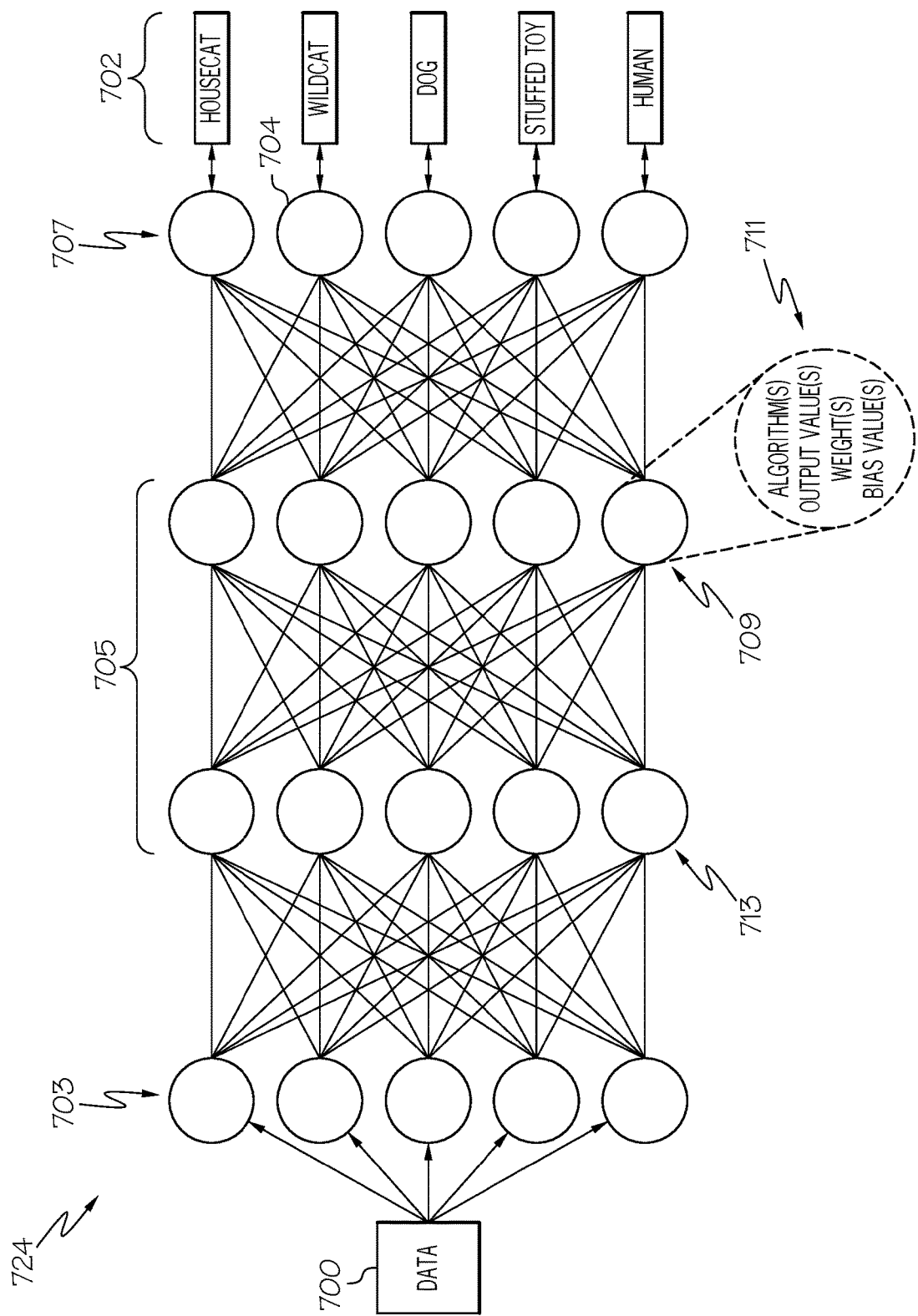
FIG. 7 depicts a deep neural network as used in one or more embodiments of the present invention.

With reference now to FIG. 7, a Deep Neural Network (DNN) 724 used to evaluate data in one or more embodiments of the present invention is presented. For example, data 700 is text and/or numeric data that describes features of a particular type of object, event, etc.

The electronic neurons in DNN 724 are arranged in layers, known as an input layer 703, hidden layers 705, and an output layer 707. The input layer 703 includes neurons/nodes that take input data, and send it to a series of hidden layers of neurons (e.g., hidden layers 775), in which neurons from one layer in the hidden layers are interconnected with all neurons in a next layer in the hidden layers 705. The final layer in the hidden layers 705 then outputs a computational result to the output layer 707, which is often a single node for holding vector information. In an embodiment of the present invention, each neuron in the output layer 707 is associated with a particular label from output labels 702, as shown in FIG. 7.

As just mentioned, each node in the depicted DNN 724 represents an electronic neuron, such as the depicted neuron 709. As shown in block 711, each neuron (including neuron 709) functionally includes at least three features: a mathematical function, an output value, a weight, and a bias value.

The mathematical function is a mathematic formula for processing data from one or more upstream neurons. For example, assume that one or more of the neurons depicted in the middle hidden layers 705 send data values to neuron 709. Neuron 709 then processes these data values by executing the mathematical function shown in block 711, in order to create one or more output values, which are then sent to another neuron, such as another neuron within the hidden layers 705 or a neuron in the output layer 707. Each neuron also has a weight that is specific for that neuron and/or for other connected neurons. Furthermore, the output value(s) are added to bias value(s), which increase or decrease the output value, allowing the DNN 724 to be further "fine tuned".

For example, assume that neuron 713 is sending the results of its analysis of a piece of data to neuron 709. Neuron 709 has a first weight that defines how important data coming specifically from neuron 713 is. If the data is important, then data coming from neuron 713 is weighted heavily, and/or increased by the bias value, thus causing the mathematical function (s) within neuron 709 to generate a higher output, which will have a heavier impact on neurons in the output layer 707. Similarly, if neuron 713 has been determined to be significant to the operations of neuron 709, then the weight in neuron 713 will be increased, such that neuron 709 receives a higher value for the output of the mathematical function in the neuron 713. Alternatively, the output of neuron 709 can be minimized by decreasing the weight and/or bias used to affect the output of neuron 709. These weights/biases are adjustable for one, some, or all of the neurons in the DNN 424, such that a reliable output will result from output layer 707. In one or more embodiments of the present invention, finding the values of weights and bias values is done automatically by training the neural network. In one or more embodiments of the present invention, manual adjustments are applied to tune the hyperparameters such learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 707 matches expectations. For example, assume that input layer 703 receives inputs that describe a housecat. In an exemplary input, the input to input layer 703 contains values that describe a housecat. If DNN 724 has been properly trained (by adjusting the mathematical function (s), output value(s), weight(s), and biases in one or more of the electronic neurons within DNN 724) to output a 5-tuple output vector (e.g., 0.2, 0.9, 0.2, 0.3, 0.4) to the output layer 707, indicating that the neuron 704 that is associated with the label "housecat" has the highest value (0.9), then it indicates that the data 700 describes a housecat.

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 707 improves (e.g., gets closer to outputting a highest value to neuron 704, thus indicating that the data 700 describes a housecat).

In one or more embodiments of the present invention, a Convolutional Neural Network (CNN) is utilized to analyze images.

A CNN is similar to a DNN in that both utilize interconnected electronic neurons. However, a CNN is different from a DNN in that 1) a CNN has neural layers whose sizes are based on filter sizes, stride values, padding values, etc. (see FIG. 9) and 2) a CNN utilizes a convolution scheme to analyze image data (see FIG. 10). A CNN gets its "convolutional" name based on a convolution (i.e., a mathematical operation on two functions to obtain a result) of filtering and pooling pixel data (a mathematical operation on two functions) in order to generate a predicted output (obtain a result).

Figure 8:
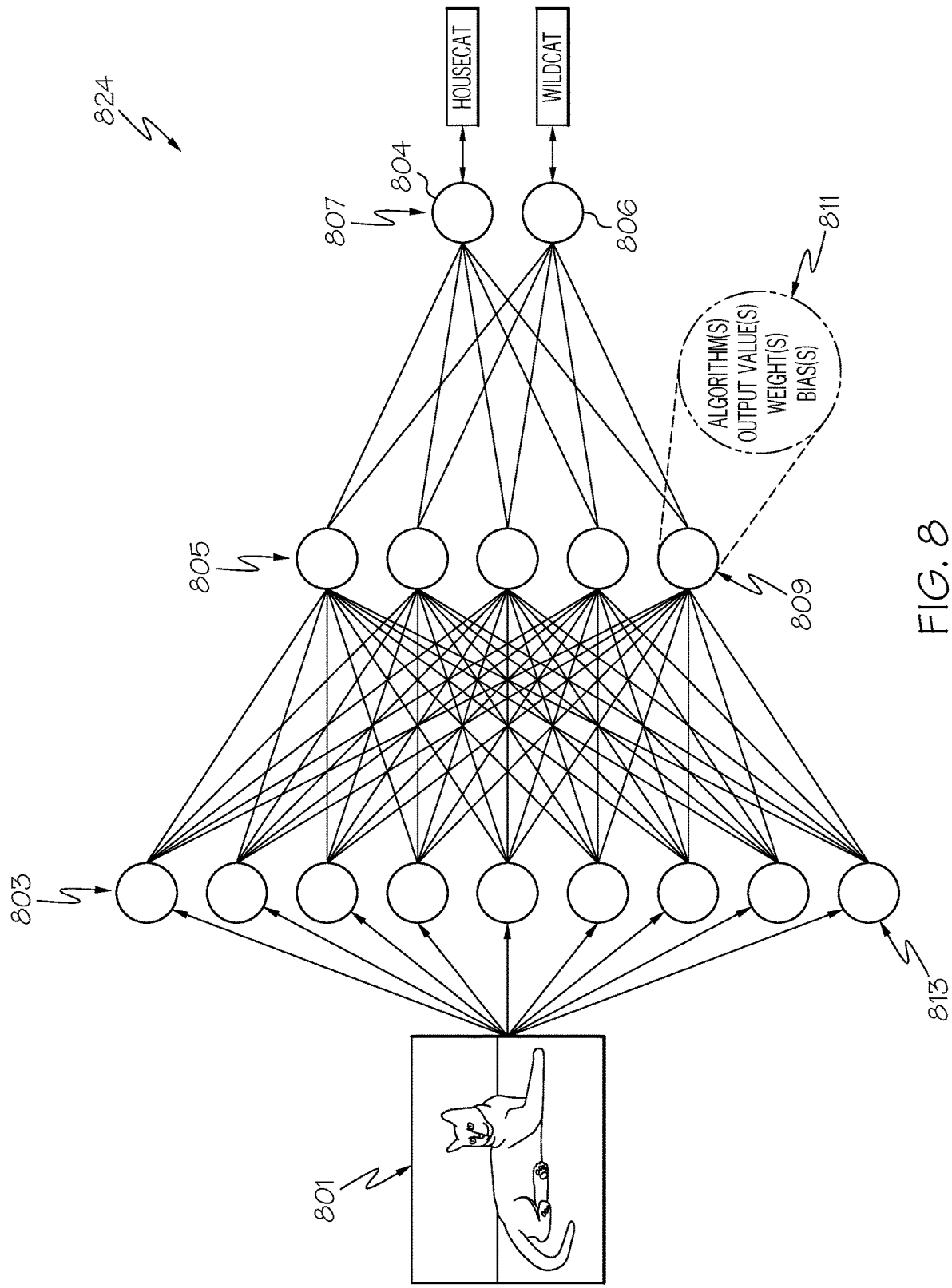
FIG. 8 illustrates an exemplary Convolutional Neural Network (CNN) as used in one or more embodiments of the present invention.

With reference now to FIG. 8, an exemplary CNN 824 is presented. Each depicted node in FIG. 8 represents a neuron (i.e., an electronic neuron). In accordance with one or more embodiments of the present invention, an input layer 803 includes neurons that receive data that describes pixels from a photograph, such as housecat image 801. The neurons from the input layer 803 of the CNN 824 connect neurons in a middle layer 805, which connect to neurons in the output layer 807.

As just mentioned, each node in the depicted CNN 824 represents an electronic neuron, such as the depicted neuron 809. As shown in block 811, each neuron (including neuron 809) functionally includes at least four features: a mathematical function, an output value, a weight, and a bias (similar to those described in neuron nodes in the DNN 724 shown in FIG. 7.

For example, assume that neuron 813 is sending the results of its analysis of a piece of the housecat image 801 to neuron 809. Neuron 809 has a first weight that defines how important data coming specifically from neuron 813 is. If the data is important, then data coming from neuron 813 is weighted heavily, thus causing the mathematical function (s) within neuron 809 to generate a higher output, which will have a heavier impact on neurons in the output layer 807. Similarly, if neuron 583 has been determined to be significant to the operations of neuron 809, then the weight in neuron 813 will be increased, such that neuron 809 receives a higher value for the output of the mathematical function in the neuron 813. These weights are adjustable for one, more, or all of the neurons in the CNN 824, such that a reliable output will result from output layer 807. In one or more embodiments of the present invention, finding the values of weights and bias values is done automatically by training the neural network. In one or more embodiments of the present invention, manual adjustments are applied to tune the hyperparameters such learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels of the different inputs.

When manually adjusted, the weights are adjusted by the user, sensor logic, etc. in a repeated manner until the output from output layer 807 matches expectations. For example, assume that input layer 803 receives pixel values (color, intensity, shading, etc.) from pixels in a photograph of a housecat (housecat image 801). If the output from output layer 807 includes neuron/node 804, which is associated with "housecat", then the weights (and/or the mathematical function and/or biases in "upstream" nodes/neurons) are adjusted until neuron/node 804 contains the highest value in the output layer 807 when pixel data from a photograph of a housecat is input into input layer 803.

When automatically adjusted, the weights (and/or mathematical functions and/or biases) are adjusted using "back propagation", in which weight values and/or biases and/or mathematical functions of the neurons are adjusted by using a "gradient descent" method that determines which direction each weight value should be adjusted to. This gradient descent process moves the weight in each neuron in a certain direction until the output from output layer 807 improves (e.g., neuron 804 has a higher value than node 806 that is associated with the label "housecat".

Figure 9:
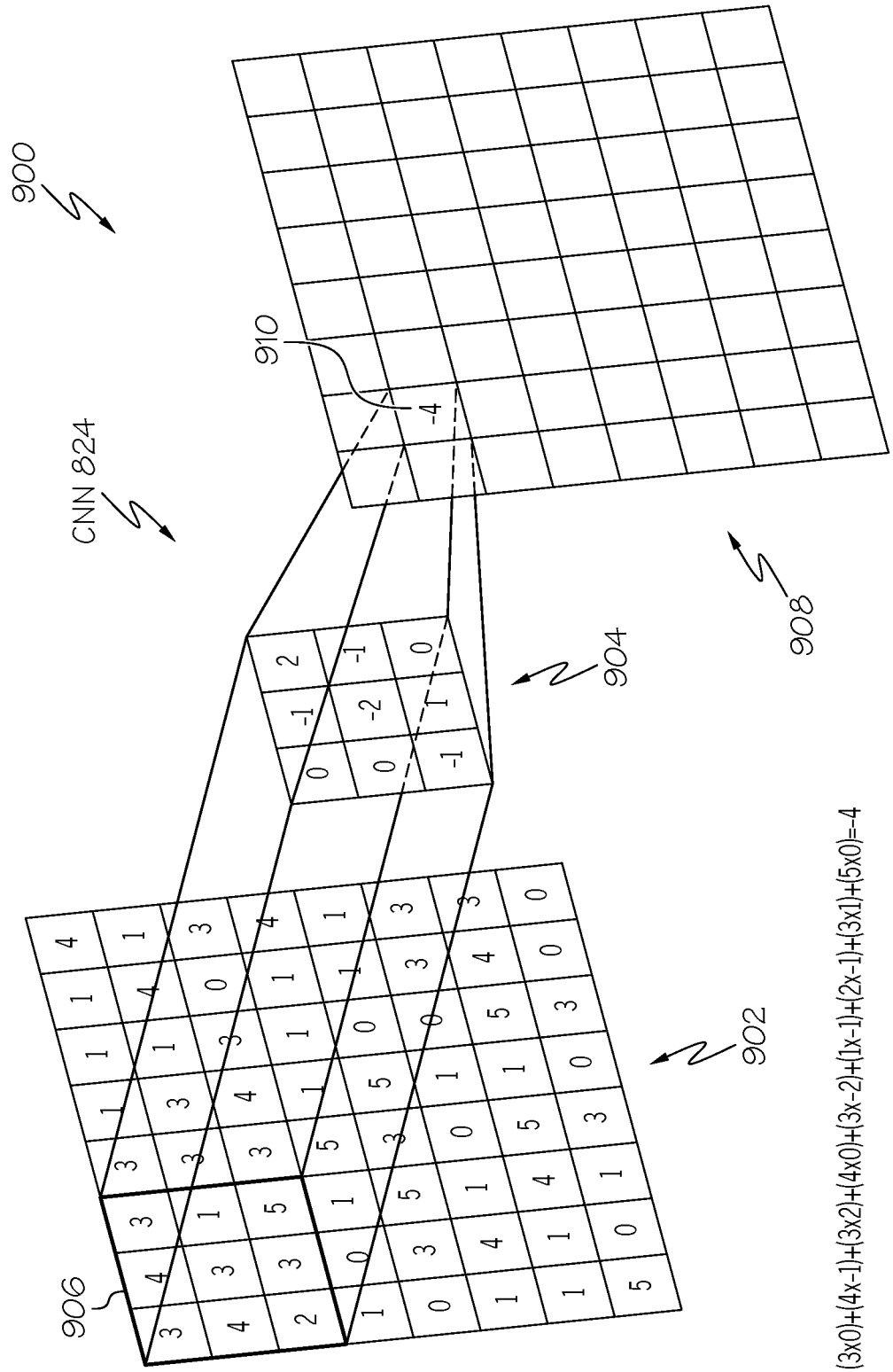
FIG. 9 depicts additional functionality detail of the CNN illustrated in FIG. 8.
Figure 10:
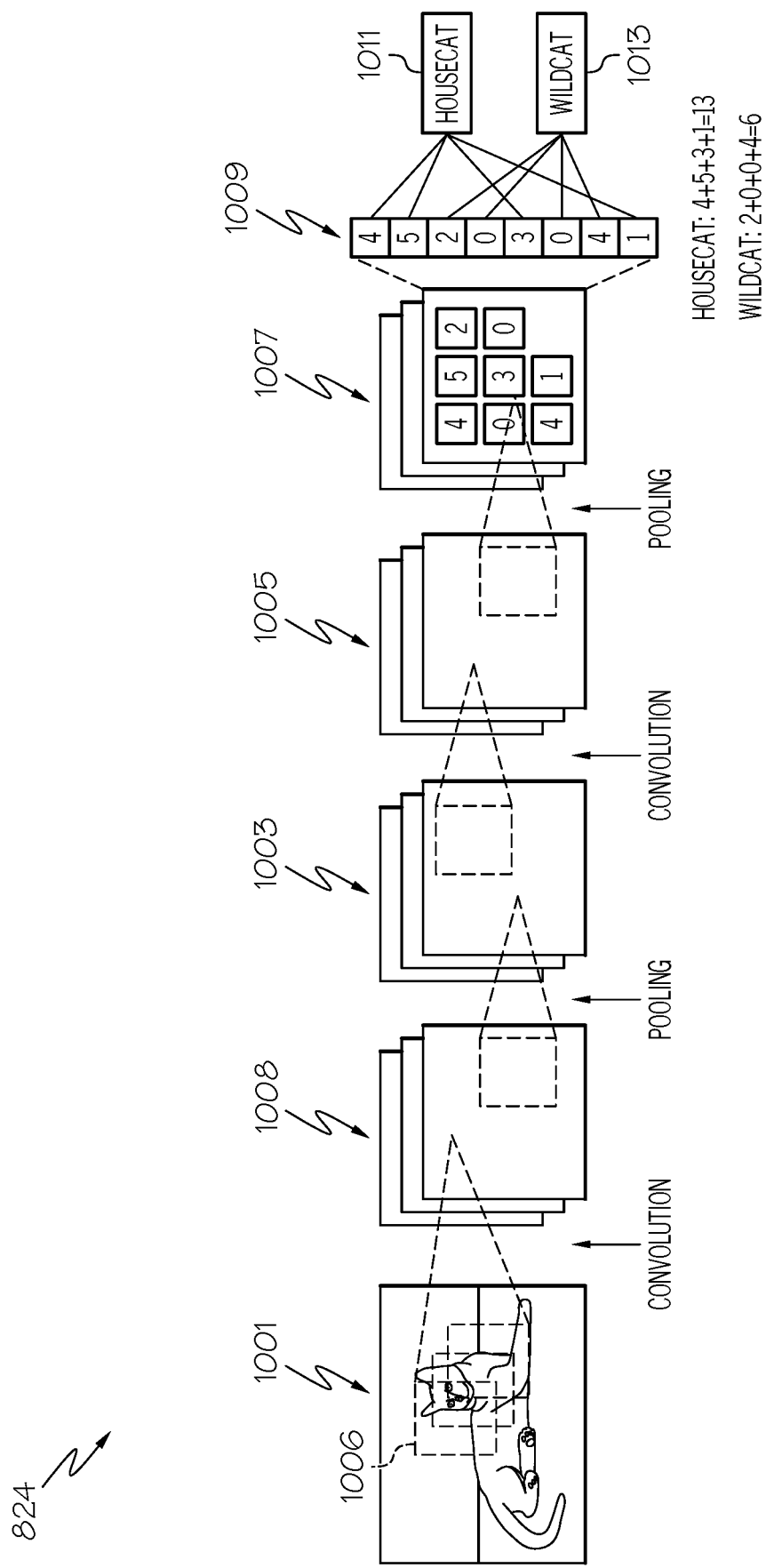
FIG. 10 illustrates an exemplary photo image being evaluated/inferred in order to train and/or test a CNN in accordance with one or more other embodiments of the present invention.

A CNN process includes 1) a convolution stage (depicted in FIG. 9), followed by a 2) pooling stage and a classification stage (depicted in FIG. 10).

With reference now to FIG. 9, a convolution/pooling scheme to analyze image data is presented in CNN convolution process 900. As shown in FIG. 9, pixel data from a photographic image (e.g., housecat image 801 shown in FIG. 8) populates an input table 902. Each cell in the input table 902 represents a value of a pixel in the photograph. This value is based on the color and intensity for each pixel. A subset of pixels from the input table 902 is associated with a filter 904. That is, filter 904 is matched to a same-sized subset of pixels (e.g., pixel subset 906) by sliding the filter 904 across the input table 902. The filter 904 slides across the input grid at some predefined stride (i.e., one or more pixels). Thus, if the stride is "1", then the filter 904 slides over in increments of one (column) of pixels. In the example shown in FIG. 9, this results in the filter 904 sliding over the subset of pixels shown as pixel subset 906 (3,4,3,4,3,1,2,3,5 when read from left to right for each row) followed by filter 904 sliding over the subset of pixels just to the right (4,3,3,3,1,3,2,5,3). If the stride were "2", then the next subset of pixels that filter 904 would slide to would be (3,3,1,1,3,3,5,3,4).

Filter 904 is applied against each pixel subset using a mathematical formula. That is, the values in the filter 904 are added to, subtracted from, multiplied by, divided by, or otherwise used in a mathematical operation and/or algorithm with the values in each subset of pixels. For example, assume that the values in filter 904 are multiplied against the pixel values shown in pixel subset 906 ((3x0)+(4x−1)+(3x2)+(4x0)+(3x−2)+(1x−1)+(2x−1)+(3x1)+(5x0)) to arrive at the value of −4. This value is then used to populate feature map 908 with the value of −4 in cell 910.

In a preferred embodiment, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tanh function, and so on.

In an embodiment, each subset of pixels uses a same filter. However, in a preferred embodiment, the filter used by each subset of pixels is different, thus allowing a finer level of granularity in creating the feature map.

With reference now to FIG. 10, the pooling stage and a classification stage (as well as the convolution stage) of a CNN 824 during inference processing is depicted. That is, once the CNN 824 is optimized by adjusting weights and/or mathematical functions and/or biases in the neurons (see block 811 in FIG. 8), by adjusting the stride of movement of the pixel subset 906 (see FIG. 9), and/or by adjusting the filter 904 shown in FIG. 9, then it is trusted to be able to recognize similar objects in similar photographs. This optimized CNN is then used to infer (hence the name inference processing) that the object in a new photograph is the same object that the CNN has been trained to recognize.

As shown in FIG. 10, assume that pixels from a photograph (cat image 1001) are used as inputs to the input table 902 shown in FIG. 9, using a CNN that has been previously defined and optimized to recognize the image of a housecat. Assume further that a series of pixel subsets, including the pixel subset 1006 (analogous to pixel subset 906 shown in FIG. 9) are convolved (using the process described in FIG. 10), thus resulting in a set of feature maps 1008 (analogous to feature map 908 shown in FIG. 9). Once the feature maps 1008 are generated, they are pooled into smaller pooled tables 1003, in order to reduce the dimensionality of the values, thereby reducing the number of parameters and computations required in the CNN process. Once these pooled tables 1003 are created, they themselves are then convoluted to create new (and even more compressed) feature maps 1005, which are then pooled to create even more compressed pooled tables 1007.

The pooled tables 1007 (which in an embodiment is actually a single table) are "unrolled" to form a linear vector, shown in FIG. 10 as a fully connected layer 1009. Fully connected layer 1009 is connected to a prediction output, including prediction output 1011 (for a housecat) and prediction output 1113 (for a wildcat).

For example, assume that for a prediction output to be considered accurate, it must have an arbitrarily chosen total value of 10 or greater for the sum of values from cells in the fully connected layer 1009 to which it is connected. As such, the prediction output 1011 is connected to cells in the fully connected layer 1009 that have the values of 4, 5, 3, and 1, resulting in a sum total of 13. Thus, the CNN 824 concludes that cat image 1001 includes an image of a housecat. In one or more embodiments, an output function, such as a softmax function, amplifies larger output values, attenuates smaller output values, and normalizes all output values in order to ensure that their total sum is one. That is, rather than assigning an arbitrary number (e.g., 10) as being what the sum total of values in certain cells from the connected layer 1009 must exceed in order to indicate that a particular entity (e.g., a housecat) is portrayed in the new photograph, an output function such as a softmax function dynamically adjusts the output values and then normalizes them, such that they sum up to 1.0 or some other predetermined number. Thus, while the described values shown in FIG. 10 describe the concept of output values describing entities in the photographs, in practice a static threshold value is not used in certain embodiments. Rather, in this alternative/preferred embodiment, the system utilizes a normalized summation (as just described), in order to further control the output characteristics, thus more accurately determining the label of the object in the photograph.

The prediction output 1013 for a wildcat is only 6 (2+0+0+4) based on the cells in the fully connected layer 1009 to which it is attached. However, if the pixels in the cat image 1001 were of a wildcat, then the fully connected layer 1009 (if properly trained) would result in the values of the cells in the fully connected layer 1009 that are connected to the prediction output 1011 to total less than 10, while the values of the cells in the fully connected layer 1009 that are connected to the prediction output 1013 would be more than 10.

While FIG. 10 depicts that a collection of values from the fully connected layer 1009 are used to identify what is in cat image 1001, in another embodiment each node/neuron in the fully connected layer 1009 is assigned a different label, as depicted in FIG. 7 for a DNN 724.

As discussed above with regard to FIG. 10, inference is the process of using a trained CNN to recognize certain objects from a photograph or other data. In the example in FIG. 10, pixels from cat image 1001 are input into a trained CNN (e.g., CNN 824), resulting in the identification and/or labeling (for display on the photograph/cat image 1-01) a particular object, such as the housecat.

That is, a CNN is trained to recognize a certain object (e.g., a housecat in a photograph). By using a new photograph as an input to the trained CNN, a housecat in the new photograph is also identified/labeled using a process known as inferencing. This inferencing occurs in real time, and recognizes specific objects (e.g., a housecat) by running the new photograph through the trained CNN.

Figure 11:
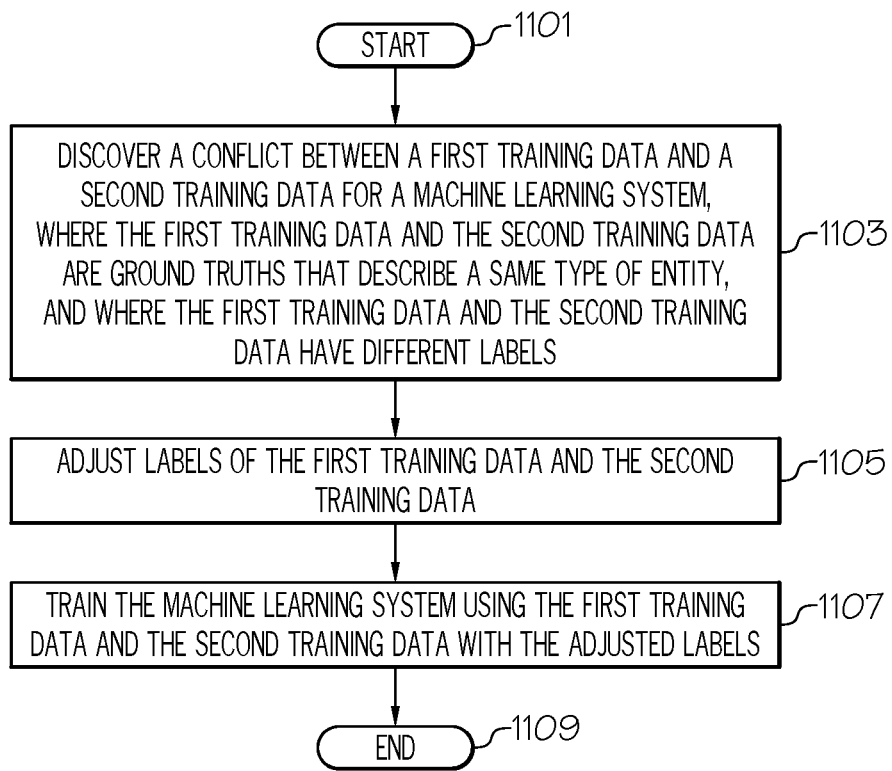
FIG. 11 is a high-level flow chart of one or more steps performed in accordance with one or more embodiments of the present invention.

With reference now to FIG. 11, a high-level flow chart of one or more operations performed by one or more embodiments of the present invention is presented.

After initiator block 1101, a conflict detection system (e.g., computer 101 shown in FIG. 1) discovers a conflict between a first training data and a second training data for a machine learning system, as described in block 1103 and depicted in FIG. 2. As described herein, the first training data and the second training data are ground truths that describe a same type of entity, but the first training data and the second training data have different labels.

As described in block 1105 in FIG. 11, in response to discovering the conflict between the first training data and the second training data for the machine learning system, the different labels of the first training data and the second training data are adjusted (e.g., by oracle 210 shown in FIG. 2). In various embodiments of the present invention, this adjustment is to reassign the training data to other labels/classes; remove training data entirely; and/or edit the label and/or the training data; etc.

As described in block 1107 in FIG. 11, the machine learning system (e.g., DNN 724 shown in FIG. 7, CNN 824 shown in FIG. 8, and/or any other type of machine learning system/algorithm) is trained using the first training data and the second training data with the same label.

The flow-chart ends at terminator block 1109.

In an embodiment of the present invention, the conflict is discovered by the conflict detection system by: generating unsupervised clustering similar ground truth training data to create a training data cluster; and performing cross validation of the training data cluster in order to filter out training data that creates a false positive from the artificial intelligence, as described in FIG. 5.

In an embodiment of the present invention, the conflict is a result of human error by human labelers when labeling the first training data and the second training data. For example, a first human may see a photograph of a housecat and label it "housecat", while a second human may see a photograph of a wildcat and also label it as "housecat". This results in the conflict as defined herein.

In an embodiment of the present invention, the conflict is a result of a vagueness in one or more of the different labels. For example, if the vague label "animal" is used to label a photograph of a housecat, a wildcat, and a dog, then this vague label will lead to a poorly trained machine learning system.

In an embodiment of the present invention, the machine learning system is a deep neural network, and the first training data and the second training data for the machine learning system are generated from a data document. That is, in FIG. 7, data 700 is different training data (the first training data and the second training data) that is extracted from a data document (text, numerical, etc.). As such, if the extracted first and second training data are ground truths that describe a same type of entity, but have different labels, then they are in conflict with one another.

In an embodiment of the present invention, the machine learning system is a convolutional neural network, and the first training data and the second training data for the machine learning system are generated from photographs. That is, in FIG. 8, housecat image 801 is actually two images (the first training data and the second training data) that are extracted from photographs. As such, if the extracted first and second training data are ground truths that describe a same type of entity, but have different labels, then they are in conflict with one another.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
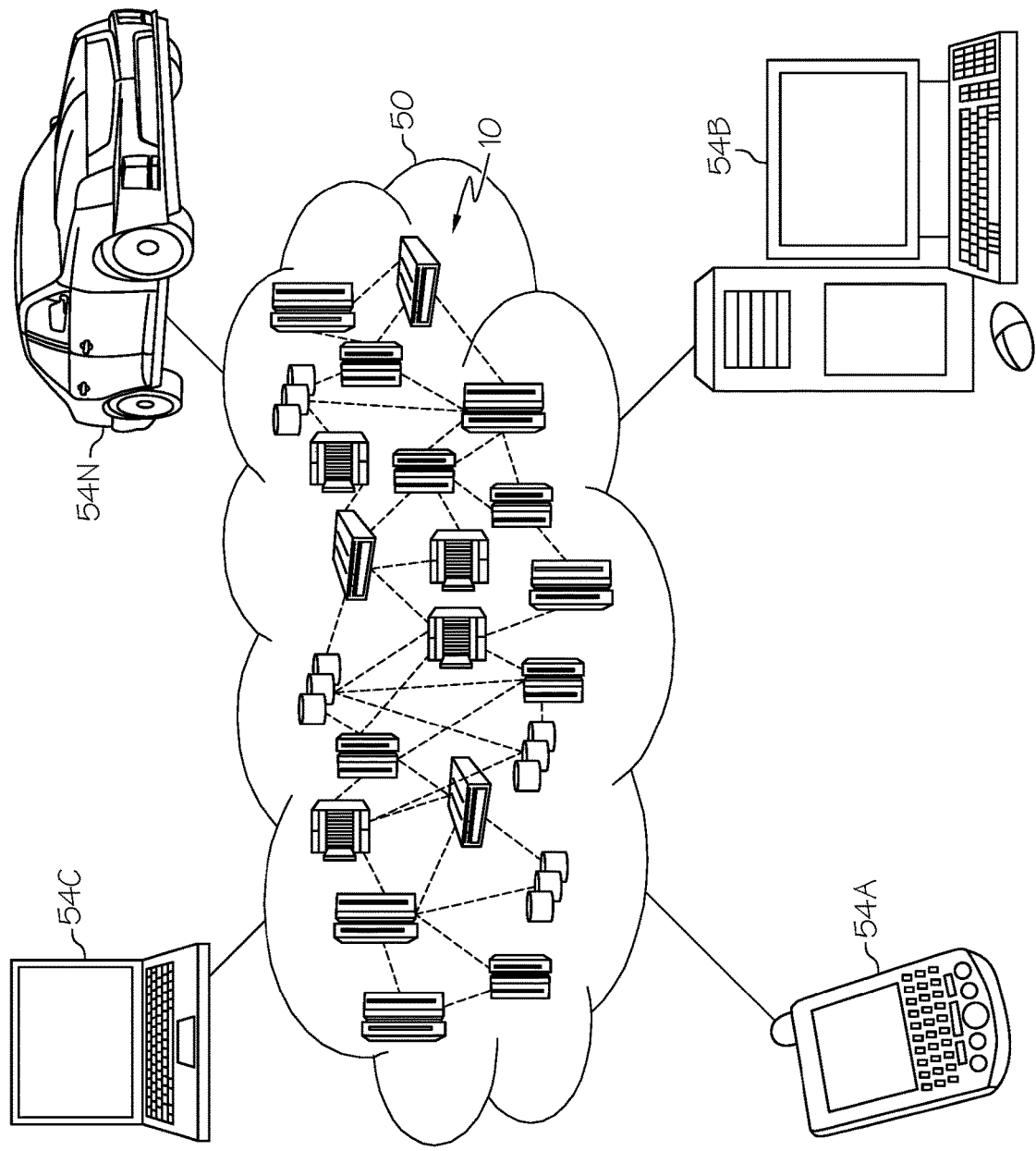
FIG. 12 depicts a cloud computing environment according to an embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 12 are intended to be illustrative only and that computing nodes 10 and cloud computing environment 50 can communicate with any type of computerized device over any type of network and/or network addressable connection (e.g., using a web browser).

Figure 13:
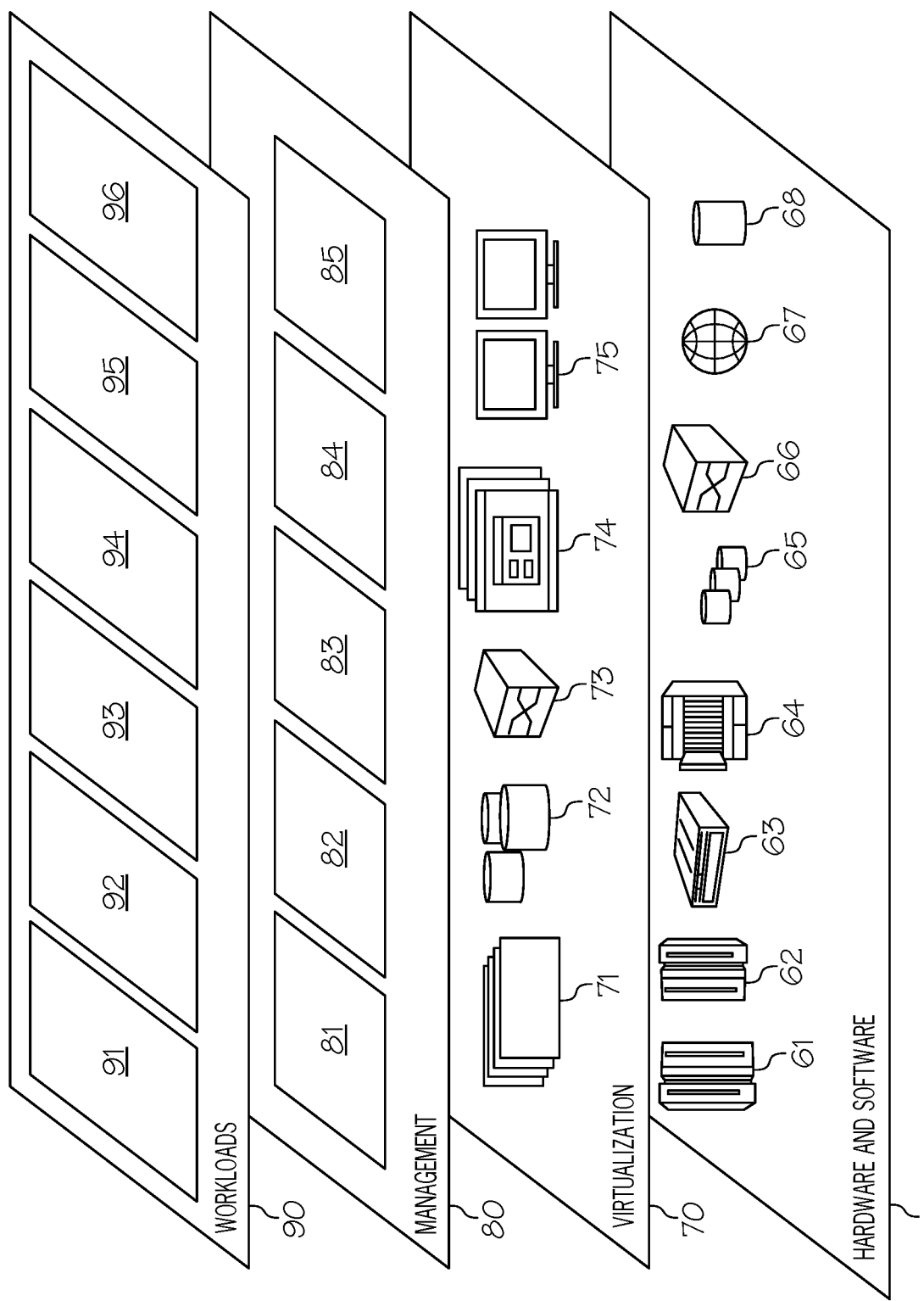
FIG. 13 depicts abstraction model layers of a cloud computer environment according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and machine learning processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   discovering, by a conflict detection system, a ground truth conflict between a first training data and a second training data fora machine learning system based on context of ground truth data, wherein
   the discovering further comprises using ground truth clustering with cross validation and decision space clustering to train the machine learning system from all ground truth data, wherein
   the first training data and the second training data are a same text query, and wherein the first training data and the second training data have different labels that describe the same text query, and wherein
   the conflict is caused by the different labels describing one or more different ground truths that are accurate in different contexts, and wherein
   context of the one or more different ground truths is based on information found in the first training data and the second training data as well as information found in similar ground truth examples, and wherein
   the using of decision space clustering comprises training the machine learning system with all the ground truth data, generating confidence vectors for each ground truth example, clustering the confidence vectors based on density in an unsupervised manner, and comparing the clusters of the confidence vectors with original labeling to determine one or more conflicts;
   in response to discovering the ground truth conflict between the first training data and the second training data for the machine learning system based on the different labels, applying conflict resolutions to the first training data and the second training data based on the context of the one or more different ground truths; and
training the machine learning system using the first training data and the second training data with adjusted context-based labels.

2. The method of claim 1, wherein the using of ground truth clustering with cross validation comprises:
identifying clusters of ground truth examples;
determining which of the clusters of the ground truth examples have a potential conflict;
confirming a conflict for each of the clusters of the ground truth examples that were determined to have a potential conflict by using cross validation;
filtering out the clusters of the ground truth examples that were not confirmed to have a conflict; and
training the machine learning system with the clusters of the ground truth examples that were confirmed to have a conflict.

3. The method of claim 1, wherein the conflict is a result of human error by human labelers when labeling the first training data and the second training data.

4. The method of claim 1, wherein the conflict is a result of a vagueness in a single label, and wherein the single label describes different types of queries, and wherein each of the different types of queries need to have unique labels in order to train the machine learning system.

5. The method of claim 1, wherein the machine learning system is a deep neural network, and wherein the first training data and the second training data for the machine learning system are generated from a data document.

6. The method of claim 1, wherein the text query is about a service provided by an enterprise, wherein a label describing the first training data is relevant to the text query, and wherein a label describing the second training data is irrelevant to the text query.

7. A computer program product comprising a computer readable storage medium having program code embodied therewith, wherein the computer readable storage medium is not a transitory signal per se, and wherein the program code is readable and executable by a processor to perform a method comprising:
discovering, by a conflict detection system, a ground truth conflict between a first training data and a second training data for a machine learning system based on context of ground truth data, wherein
the discovering further comprises using ground truth clustering with cross validation and decision space clustering to train the machine learning system from all ground truth data, wherein
the first training data and the second training data are a same text query, and wherein the first training data and the second training data have different labels that describe the same text query, and wherein
the conflict is caused by the different labels describing one or more different ground truths that are accurate in different contexts, and wherein
context of the one or more different ground truths is based on information found in the first training data and the second training data as well as information found in similar ground truth examples, and wherein
the using of decision space clustering comprises training the machine learning system with all the ground truth data, generating confidence vectors for each ground truth example, clustering the confidence vectors based on density in an unsupervised manner, and comparing the clusters of the confidence vectors with original labeling to determine one or more conflicts;

in response to discovering the ground truth conflict between the first training data and the second training data for the machine learning system based on the different labels, applying conflict resolutions to the first training data and the second training data based on the context of the one or more different ground truths; and
training the machine learning system using the first training data and the second training data with adjusted context-based labels.

8. The computer program product of claim 7, wherein the using of ground truth clustering with cross validation comprises:
filtering out the clusters of the ground truth examples that were not confirmed to have a conflict; and
training the machine learning system with the clusters of the ground truth examples that were confirmed to have a conflict.

9. The method of claim 1, further comprising:
training the machine learning system to label the first training data and the second training data with the adjusted labels, wherein the adjusted labels are a same label.

10. The computer program product of claim 7, wherein the conflict is a result of a vagueness in one or more of the different labels.

11. The computer program product of claim 7, wherein the machine learning system is a deep neural network, and wherein the first training data and the second training data for the machine learning system are generated from a data document.

12. The computer program product of claim 7, wherein the text query is about a service provided by an enterprise, wherein a label describing the first training data is relevant to the text query, and wherein a label describing the second training data is irrelevant to the text query.

13. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
discovering, by a conflict detection system, a ground truth conflict between a first training data and a second training data for a machine learning system based on context of ground truth data, wherein
the discovering further comprises using ground truth clustering with cross validation and decision space clustering to train the machine learning system from all ground truth data, wherein
the first training data and the second training data are a same text query, and wherein the first training data and the second training data have different labels that describe the same text query, and wherein
the conflict is caused by the different labels describing one or more different ground truths that are accurate in different contexts, and wherein
context of the one or more different ground truths is based on information found in the first training data and the second training data as well as information found in similar ground truth examples, and wherein
the using of decision space clustering comprises training the machine learning system with all the ground truth data, generating confidence vectors for each ground truth example, clustering the confidence vectors based on density in an unsupervised manner, and comparing the clusters of the confidence vectors with original labeling to determine one or more conflicts;

in response to discovering the ground truth conflict between the first training data and the second training data for the machine learning system based on the different labels, applying conflict resolutions to the first training data and the second training data based on the context of the one or more different ground truths; and training the machine learning system using the first training data and the second training data with adjusted context-based labels.

14. The computer system of claim 13, wherein the using of ground truth clustering with cross validation comprises:
identifying clusters of ground truth examples;
determining which of the clusters of the ground truth examples have a potential conflict;
confirming a conflict for each of the clusters of the ground truth examples that were determined to have a potential conflict by using cross validation;
filtering out the clusters of the ground truth examples that were not confirmed to have a conflict; and
training the machine learning system with the clusters of the ground truth examples that were confirmed to have a conflict.

15. The method of claim 1, wherein the different labels are generated by deep neural networks.

16. The computer system of claim 13, wherein the text query is about a service provided by an enterprise, wherein a label describing the first training data is relevant to the text query, and wherein a label describing the second training data is irrelevant to the text query.

17. The method of claim 1, further comprising:
identifying a first context of the first training data and a second context of the second training data;
determining that the first context and the second context are different; and
in response to determining that the first context and the second are different, determining that there is a conflict between labels for the first training data and the second training data.

18. The method of claim 1, further comprising:
determining that a first label for the first training data is incorrect;
determining that a second label for the second training data is correct; and
in response to determining that the first label is incorrect and that the second label is correct, presenting multiple examples of the second training data to an oracle to adjust the first training data.

19. The method of claim 18, wherein the multiple examples of the second training data are multiple text examples, and wherein the method further comprises:
associating the multiple text examples with the same text query and a same class label;
ranking each of the multiple text examples according to how similar each of the multiple text examples is to the same text query; and
displaying ranked text examples with the same text query.

20. The method of claim 1, wherein the using of decision space clustering comprises:
training the machine learning system with all the ground truth data;
generating confidence vectors for each ground truth example;
clustering the confidence vectors based on density in an unsupervised manner; and
comparing the clusters of the confidence vectors with original labeling to determine one or more conflicts.

* * * * *